United States Patent
Inoue et al.

(10) Patent No.: US 9,126,653 B2
(45) Date of Patent: Sep. 8, 2015

(54) STRADDLE TYPE VEHICLE BRAKE SYSTEM AND STRADDLE TYPE VEHICLE

(71) Applicant: YAMAHA HATSUDOKI KABUSHIKI KAISHA, Shizuoka-ken (JP)

(72) Inventors: Kazuhisa Inoue, Shizuoka (JP); Takanobu Fushimi, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 71 days.

(21) Appl. No.: 13/921,924

(22) Filed: Jun. 19, 2013

(65) Prior Publication Data
US 2014/0008139 A1    Jan. 9, 2014

(30) Foreign Application Priority Data
Jul. 4, 2012    (JP) .................. 2012-150741

(51) Int. Cl.
*B60T 8/00*    (2006.01)
*B62L 3/08*    (2006.01)
*B62K 11/00*    (2006.01)
*B60T 8/1766*    (2006.01)

(52) U.S. Cl.
CPC ................. *B62L 3/08* (2013.01); *B60T 8/1766* (2013.01); *B62K 11/00* (2013.01)

(58) Field of Classification Search
USPC ............... 303/9.61–9.69, 9.71–9.75, 139
See application file for complete search history.

(56) References Cited

U.S. PATENT DOCUMENTS

| | | | | |
|---|---|---|---|---|
| 7,611,212 B2 * | 11/2009 | Nakayama et al. | ........... | 303/9.64 |
| 7,722,130 B2 * | 5/2010 | Takeuchi | ............ | 303/9.64 |
| 2006/0152071 A1 | 7/2006 | Takeuchi | | |
| 2006/0250022 A1 * | 11/2006 | Hasegawa et al. | ............ | 303/139 |
| 2010/0066160 A1 * | 3/2010 | Atsushi et al. | ............ | 303/9.64 |
| 2011/0031054 A1 * | 2/2011 | Matayoshi | ............ | 180/227 |

FOREIGN PATENT DOCUMENTS

| | | |
|---|---|---|
| CN | 1319519 A | 10/2001 |
| CN | 101239639 A | 8/2008 |
| CN | 201105795 Y | 8/2008 |
| CN | 102126534 A | 7/2011 |
| CN | 102167122 A | 8/2011 |
| EP | 1 674 387 A2 | 6/2006 |
| JP | H09-58434 A | 3/1997 |
| JP | 2001-278170 A | 10/2001 |
| JP | 2006-199275 A | 8/2006 |

OTHER PUBLICATIONS

Chinese Office Action issued on Apr. 20, 2015.

* cited by examiner

*Primary Examiner* — Christopher Schwartz
(74) *Attorney, Agent, or Firm* — Rabin & Berdo, P.C.

(57) ABSTRACT

A brake system is disclosed. The brake system includes a front brake, a rear brake, a right brake lever for operating the front brake, and a left brake lever for operating the rear brake. The brake system also includes a brake pedal for operating the front brake and rear brake such that the front brake and rear brake work in an interlocked manner.

10 Claims, 6 Drawing Sheets

STRADDLE TYPE VEHICLE BRAKE SYSTEM AND STRADDLE TYPE VEHICLE

CROSS REFERENCE TO RELATED APPLICATION

The entire disclosure of the inventor's corresponding Japanese patent application, Serial No. JP 2012-150741, filed Jul. 4, 2012, is hereby incorporated by reference.

BACKGROUND

1. Technical Field

The present invention relates to straddle type vehicle brake systems.

2. Description of the Background Art

Brake systems that can be used in a motorcycle, a type of a straddle type vehicle, are known, as disclosed in JP Hei9 (1997)-58434 A. The brake system disclosed in this document includes a front brake operating lever and a rear brake operating lever. The rear brake operating lever is configured to cause the front and rear brakes to work in an interlocked manner.

More specifically, the rear brake operating lever is coupled with an equalizer, which is connected with a rear brake cable connected with a rear brake and an interlocking cable connected with the front brake operating lever. The equalizer is configured to divide the force received by the rear brake operating lever among the rear brake cable and the interlocking cable.

The interlocking cable is connected with the front brake operating lever to operate the same. Thus, the operating force transferred to the interlocking cable via the equalizer operates the front brake operating lever to actuate the front brake.

A property setting spring is provided on the interlocking cable for biasing the interlocking cable in the direction opposite that of the force applied to the front brake operating lever by the interlocking cable. Thus, if the operating force generated as the rear brake operating lever is operated is smaller than the biasing force of the property setting spring, the operating force is transferred to the rear brake cable via the equalizer. Thus, in this case, only the rear brake is actuated. On the other hand, if the operating force generated as the rear brake operating lever is operated is equal to or larger than the biasing force of the property setting spring, the operating force is transferred to the interlocking cable and then the front brake operating lever via the equalizer. Thus, in this case, not only the rear brake, but also the front brake is actuated.

SUMMARY

In the arrangement described in JP Hei9(1997)-58434A, it is possible to actuate the front brake alone. However, the rear brake may be actuated together with the front brake in an interlocked manner and cannot be actuated alone.

There is a need among riders to actuate the rear brake alone according to road conditions, vehicle travel conditions or the like to control the position of the vehicle or lock the rear wheel. As discussed above, the arrangement described in JP Hei9(1997)-58434 A does not allow the rear brake to be actuated alone and thus does not address that need.

The present invention provides a straddle type vehicle brake system that allows the front and rear brakes to work in an interlocked manner and also allows the brakes to be actuated independently.

A straddle type vehicle brake system according to an embodiment of the present invention includes: a front brake; a rear brake; a front brake operating device for operating the front brake; a rear brake operating device for operating the rear brake; and an interlocking brake operating device for operating the front and rear brakes such that the front and rear brakes work in an interlocked manner.

The straddle type vehicle brake system according to the embodiment of the present invention includes, as separate components, a front brake operating device for operating the front brake, a rear brake operating device for operating the rear brake, and an interlocking brake operating device for causing the front and rear brakes to work in an interlocked manner. This will allow the front and rear brakes to work in an interlocked manner and also allow them to be operated independently.

DESCRIPTION OF THE EMBODIMENTS

Figure 1:
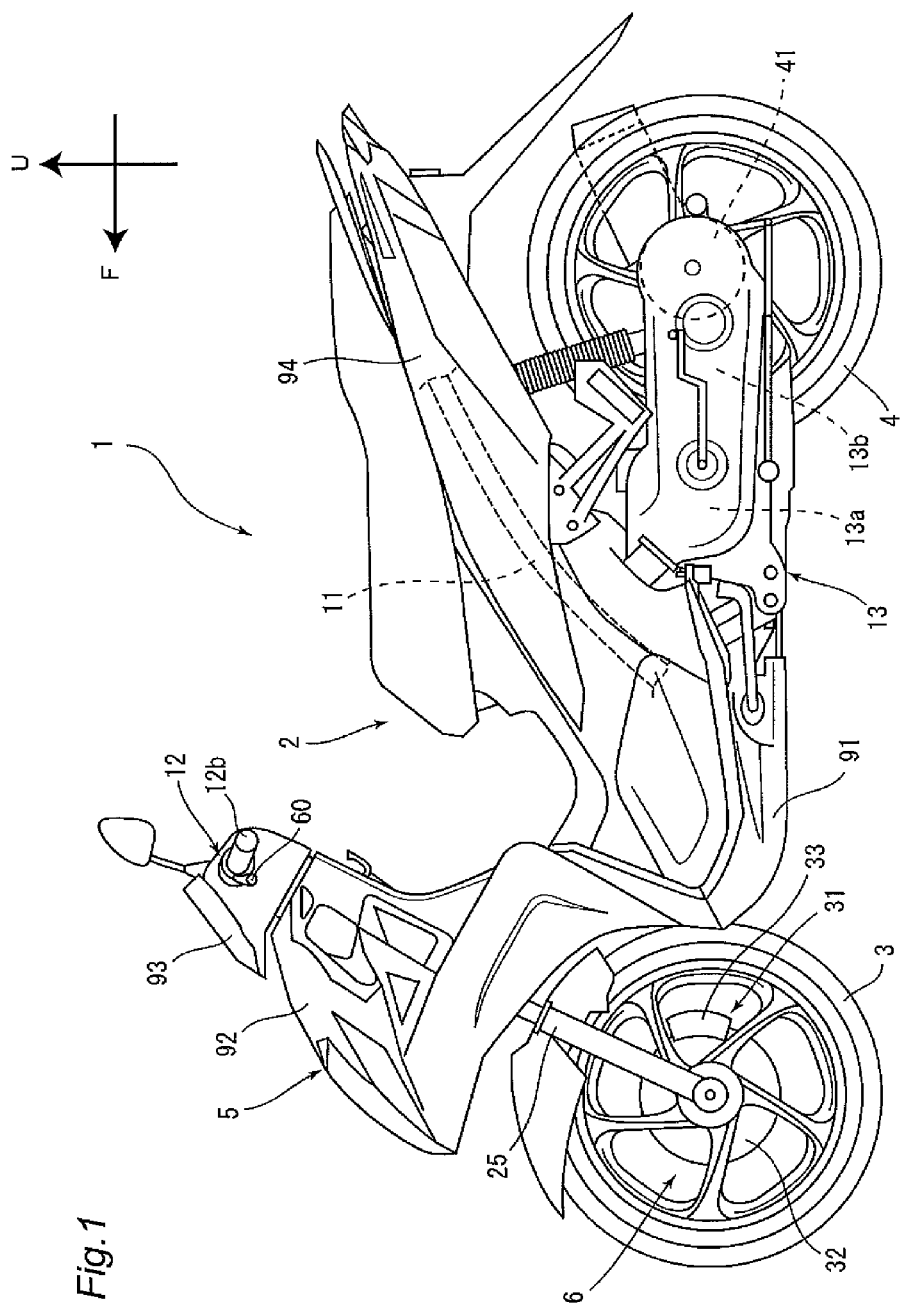
FIG. 1 is a left side view of the overall construction of a motorcycle according to Embodiment 1.

Now, embodiments will be described with reference to the drawings. The dimensions of the components shown in the drawings do not exactly represent the dimensions of the actual components or the size ratios of the components.

In the description below, "front/forward", "rear/rearward", "left" and "right" mean directions as perceived by a rider holding the handlebars 12 and sitting on the seat of the motorcycle 1.

Embodiment 1

<Overall Construction of Motorcycle>

FIG. 1 is a left side view of the overall construction of a motorcycle 1 (straddle type vehicle) according to Embodiment 1 of the present invention. The motorcycle 1 includes a vehicle body 2, a front wheel 3 located at a front portion of the vehicle body 2, and a rear wheel 4 located at a rear portion of the vehicle body 2. In FIG. 1, arrow "F" indicates the forward direction with respect to the motorcycle 1, and arrow "U" the upward direction with respect to the motorcycle 1.

The vehicle body 2 includes a body frame 11 (chassis), a body cover 5, handlebars 12 and a power unit 13. The vehicle body 2 further includes a brake system 6, discussed below.

Figure 2:
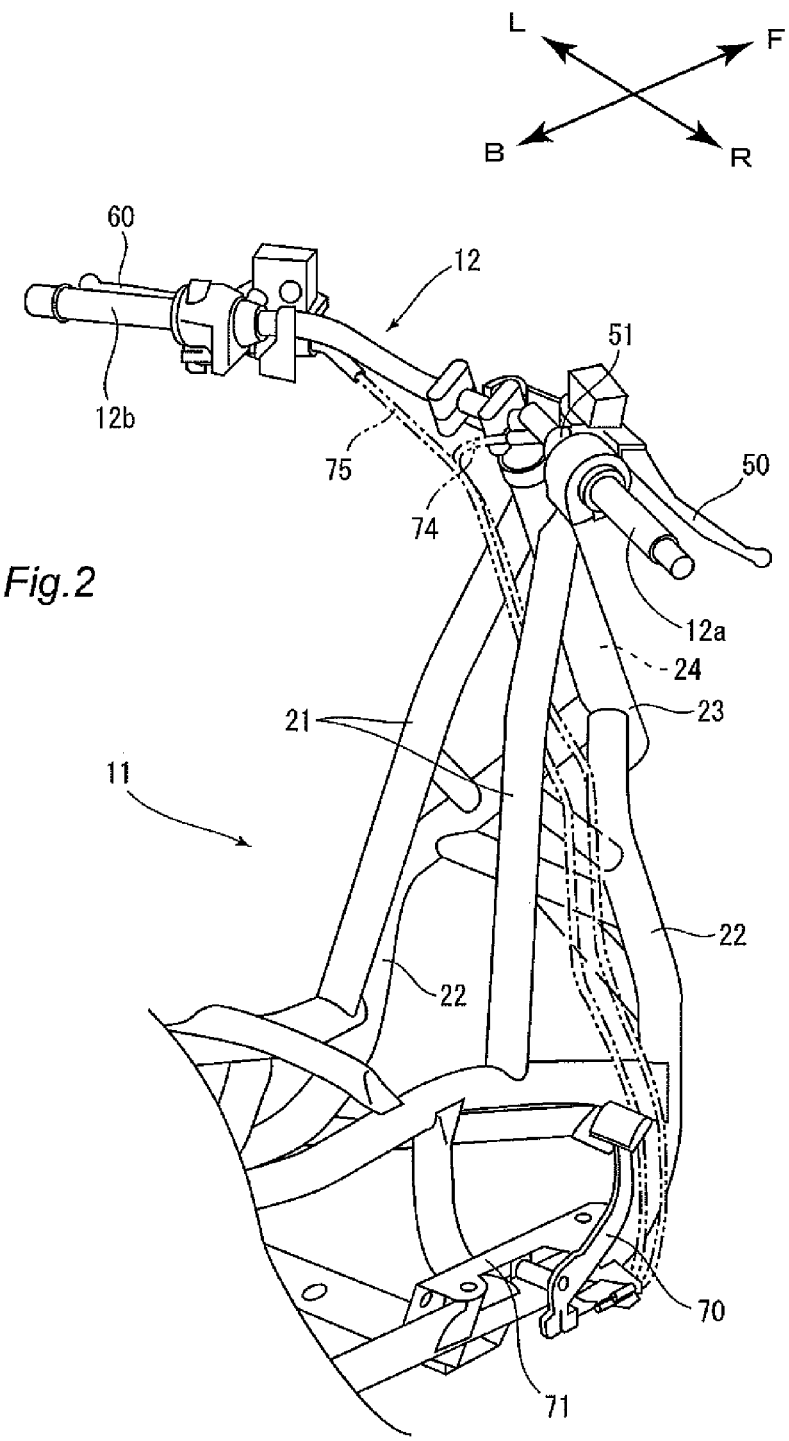
FIG. 2 is a perspective view of a front portion of the body frame of the motorcycle.

As shown in FIG. 2, the body frame 11 includes a pair of main frames 21, a pair of down frames 22 and a head pipe 23. The head pipe 23 is located in a front portion of the motorcycle 1. The main frames 21 extend rearward and downward from the head pipe 23. The down frames 22 extend downward from a position on the head pipe 23 that is located forward of the main frames 21. In FIG. 2, arrow "F" indicates the forward direction with respect to the motorcycle 1, arrow "B" the rearward direction with respect to the motorcycle 1, and arrow "R" the right direction with respect to the motorcycle 1, and arrow "L" the left direction with respect to the motorcycle 1.

A steering shaft 24 is located in the head pipe 23. Above the steering shaft 24, the handlebars 12 are rotatably connected with the head pipe 23. A pair of front suspension legs 25 (see FIG. 1), located parallel to each other, are connected with the steering shaft 24. As shown in FIG. 1, the front wheel 3 is rotatably attached to the lower ends of the front suspension legs 25.

The body frame 11 with the above arrangement is covered with the body cover 5. The body cover 5 may be made of a resin material, for example. As shown in FIG. 1, the body cover 5 includes a foot board 91 located in a lower portion of the vehicle, a front cover 92 located in a front portion of the vehicle, a handle cover 93 covering the handlebars 12, and the side covers 94 located on the sides of the vehicle.

A front brake 31 including a hydraulic disc brake, for example, is provided on the front wheel 3. The front brake 31 includes a brake disc 32 and a caliper 33. The brake disc 32, together with the front wheel 3, is rotatably supported by the lower ends of the front suspension legs 25. Although not shown, the caliper 33 is attached to portions of the front suspension legs 25 and includes, in its interior, brake pads for pressing together the brake disc 32 in a thickness direction of the disc. The brake pads are pressed against the brake disc 32 by a hydraulic pressure transferred by a hydraulic hose 34 (see FIG. 3). This action generates a braking force for the front wheel 3.

Figure 3:
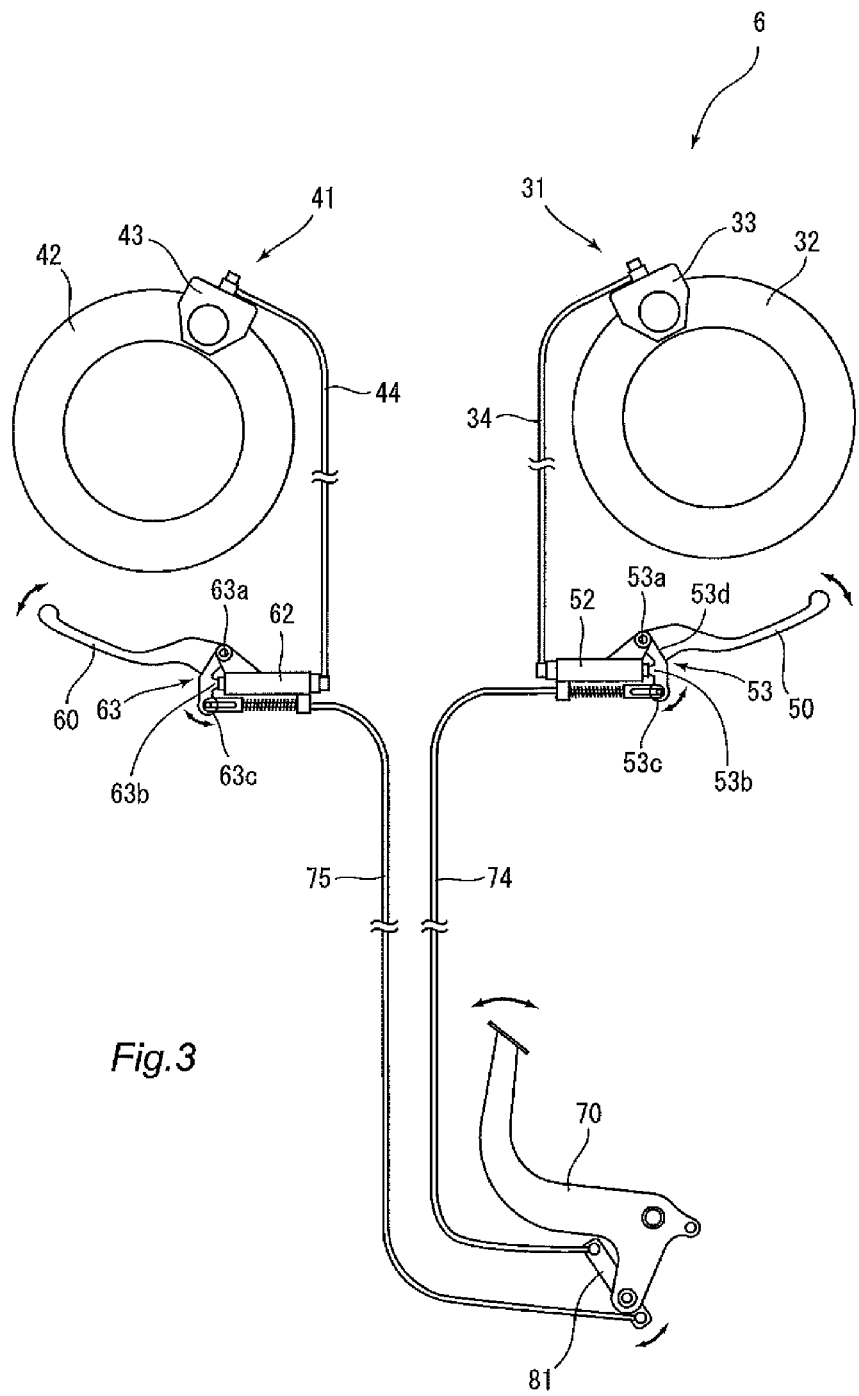
FIG. 3 is a schematic view of the overall construction of a brake system.

As shown in FIG. 3, the hydraulic hose 34 is connected with a master cylinder 52, discussed below, and transfers to the front brake 31 a hydraulic pressure generated by the master cylinder 52 as the brake pedal 70 or right brake lever 50 is operated, as discussed below.

As shown in FIG. 2, a right grip 12a is provided on the handlebars 12 and is located forward of and to the right of a rider sitting on the seat, while a left grip 12b is located forward of and to the left of the rider. Further, a right brake lever 50 that serves as the front brake operating device is provided on the handlebars 12 near the right grip 12a, while a left brake lever 60 that serves as the rear brake operating device is provided near the left grip 12b.

Figure 4:
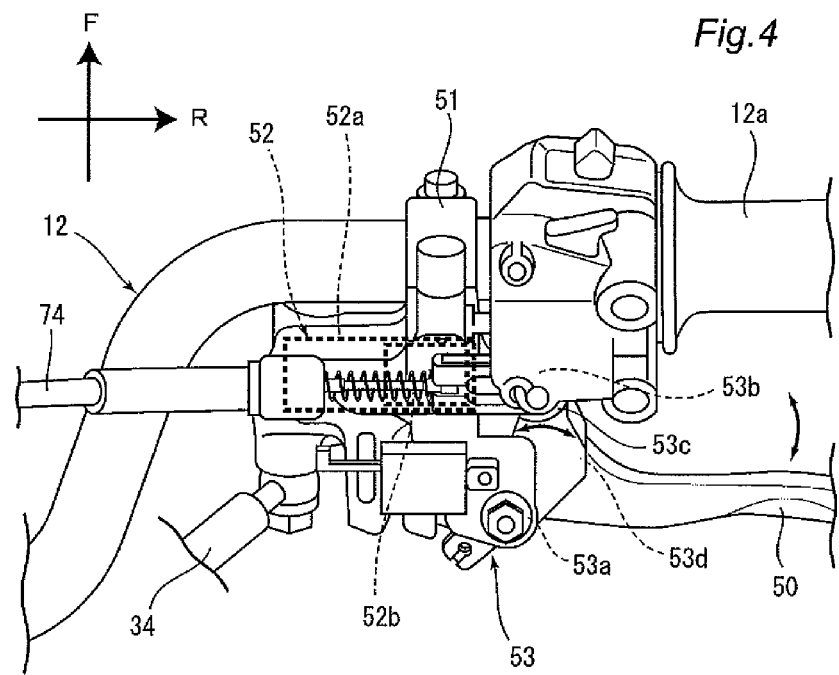
FIG. 4 is a perspective view of the right brake lever and other components.

The right brake lever 50 is rotatably supported on a connection member 51, which is attached to the handlebars 12 adjacent to the right grip 12a (see FIG. 4). Thus, the right brake lever 50 is rotatably supported on the handlebars 12 about a point on one end of the right brake lever 50. The structure of the right brake lever 50 will be detailed below. The left brake lever 60 has a similar structure to that of the right brake lever 50 and thus its description will not be given.

As shown in FIG. 2, a brake pedal 70 (interlocking brake operating device) is attached to one of the down frames 22. The brake pedal 70 may be attached to the one of the down frames 22 that is located at the right foot of a rider sitting on the seat, for example. The brake pedal 70 is rotatably supported on a support member 71 that is fixed to that down frame 22. Although not shown, the brake pedal 70 is located to penetrate the foot board 91 of the body cover 5. In other words, the top of the brake pedal 70 is exposed above the foot board 91.

A front brake wire 74 and a rear brake wire 75 are connected with the brake pedal 70 via a wire coupling member 81 of an equalizer 80, as discussed below (see FIGS. 3 and 5). Thus, the rider may cause the front and rear brakes 31 and 41 to work in an interlocked manner by kicking on the brake pedal 70. The structure of the brake pedal 70 will be detailed below.

As shown in FIG. 1, the power unit 13 is located between the body frame 11 and rear wheel 4. The power unit 13 includes an engine 13a, driving force transmission 13b and other components. The engine 13a may be a unit-swing engine, for example, where the engine may swing in a top-to-bottom direction together with the rear wheel 4 relative to the body frame 11. The driving force transmission 13b for transmitting to the rear wheel 4 a driving force output from the engine 13a is located rearward of the engine 13a with respect to the vehicle. In other words, in the power unit 13, the engine 13a is located toward the front with respect to the vehicle, while the driving force transmission 13b is located toward the rear with respect to the vehicle. A rear brake 41 is located inward of the driving force transmission 13b as measured in a vehicle width direction, i.e. located inward of a rear portion of the power unit 13 as measured in a vehicle width direction. In the present embodiment, the driving force transmission 13b includes a continuously variable transmission that does not utilize clutch operations.

Similar to the front brake 31 described above, the rear brake 41 includes a hydraulic disc brake, for example. That is, as shown in FIG. 3, the rear brake 41 similarly includes a brake disc 42 and a caliper 43. Together with the rear wheel 4, the brake disc 42 is rotatably supported by a swing arm, not shown. The caliper 43 may have a similar structure to that of the caliper 33 of the front brake 31 and thus its description will not be given.

<Brake System>

Next, the structure of the brake system 6 (straddle type vehicle brake system) provided in the motorcycle 1 including the front and rear wheels 3 and 4 will be described in detail with reference to FIGS. 3 to 5 and 6A and 6B. In FIG. 4, arrow "F" indicates the forward direction with respect to the motorcycle 1, and arrow "R" the right direction with respect to the motorcycle 1. In FIG. 5, arrow "U" indicates the upward direction with respect to the motorcycle 1, and arrow "F" the forward direction with respect to the motorcycle 1. In FIGS. 6A and 6B, arrow "F" indicates the forward direction with respect to the motorcycle 1, and arrow "B" the rearward direction with respect to the motorcycle 1.

As shown in FIG. 3, the brake system 6 includes a front and rear brakes 31 and 41. The front brake 31 only applies a braking force to the front wheel 3. The rear brake 4 only applies a braking force to the rear wheel 4. The brake system 6 further includes a rear brake lever 50 for actuating only the front brake 31, a left brake lever 60 for actuating only the rear brake 41 and a brake pedal 70 for causing the front and rear brakes 31 and 41 to work in an interlocked manner. As discussed below, the left brake lever 60 for actuating only the rear brake is located in a position different from that of the brake pedal 70. That is, the left brake lever 60 is located in one of the positions where the rider can operate the vehicle. The brake pedal 70 is located in one of these positions that is different from that of the left brake lever 60.

As shown in FIGS. 3 and 4, a master cylinder 52 is located near the right brake lever 50. More specifically, as shown in FIG. 4, the master cylinder 52 is provided on the handlebars 12 and is located closer to the center of the vehicle than the right brake lever 50. The master cylinder 52 includes a cylinder 52a and a piston 52b located inside the cylinder 52a, both indicated by the broken lines in FIG. 4. The piston 52b of the master cylinder 52 may be configured to move inwardly with respect to the cylinder 52a as the right brake lever 50 is operated, for example. The master cylinder 52 may have a typical structure and thus its detailed description will not be given.

As shown in FIG. 3, the master cylinder 52 is connected with the caliper 33 of the front brake 31 via a hydraulic hose 34. In other words, a change in the hydraulic pressure inside the master cylinder 52 is transferred to the caliper 33 of the front brake 31 via the hydraulic hose 34. Thus, when the right brake lever 50 is operated, for example, to push the piston 52b inside the master cylinder 52 inwardly with respect to the cylinder 52a, the change in the hydraulic pressure in the master cylinder 52 is transferred to the caliper 33 of the front brake 31 via the hydraulic hose 34. When the hydraulic pressure increases, the caliper 33 works to press the brake disc 32 together. Thus, the front brake 31 may be actuated by operating the right brake lever 50, for example.

The structure of the right brake lever 50 and other components will be detailed below.

As shown in FIGS. 3 and 4, a pressing member 53 is provided between the right brake lever 50 and master cylinder 52 for pressing the piston 52b of the master cylinder 52. Similar to the right brake lever 50, the pressing member 53 is rotatably supported on the connection member 51 (see FIG. 4). More specifically, the pressing member 53 is rotatable about a point on the connection member 51 coaxially with the right brake lever 50. Thus, the right brake lever 50 and pressing member 53 may be rotated about a point on the connection member 51, as indicated by the corresponding arrows in FIGS. 3 and 4.

The pressing member 53 includes a supported portion 53a that is rotatably supported by the connection member 51. The pressing member 53 is shaped to extend from the supported portion 53a toward the handlebars 12. In other words, the pressing member 53 extends to cross the handlebars 12. The pressing member 53 includes, toward the end opposite of that with the supported portion 53a (e.g., the end closer to the handlebars 12), a pressing portion 53b for pressing the piston 52b of the master cylinder 52 and a wire connecting portion 53c connected to a front brake wire 74, discussed below.

As the wire connecting portion 53c is pulled toward the center of the handlebars 12 by the front brake wire 74, the pressing member 53 with the above arrangement is rotated about a point on the supported portion 53a along a vehicle width direction, as indicated by the arrow in FIG. 4, such that the pressing portion 53b presses the piston 52b of the master cylinder 52. This causes a change in the hydraulic pressure in the master cylinder 52 such that this change in the hydraulic pressure is transferred to the caliper 33 of the front brake 31 via the hydraulic hose 34.

Further, the pressing member 53 includes a contact portion 53d for contacting the right brake lever 50 when the right brake lever 50 is operated. The contact portion 53d contacts the right brake lever 50 when the right brake lever 50 is operated. In the pressing member 53, the contact portion 53d is located closer to the handlebars 12 than the supported portion 53a is so as to rotate the pressing member 53 about a point on the supported portion 53a. As the right brake lever 50 is operated, the pressing member 53 having the above-described contact portion 53d is rotated about a point on the supported portion 53a such that the pressing portion 53b presses the piston 52b of the master cylinder 52. This causes a change in the hydraulic pressure in the master cylinder 52 such that this change in the hydraulic pressure is transferred to the caliper 33 of the front brake 31 via the hydraulic hose 34.

As such, the front brake 31 may be actuated when the front brake wire 74 is pulled or when the right brake lever 50 is operated.

As shown in FIG. 3, a master cylinder 62 is provided for the left brake lever 60, similar to the right brake lever 50, adjacent to the left brake lever 60. The master cylinder 62 may have a structure similar to that of the master cylinder 52 described above and is connected with the rear brake 41 via a hydraulic hose 44. Detailed description of the structure and operation of the master cylinder 62 will not be given.

A pressing member 63 is provided adjacent to the left brake lever 60. The structure and operation of the pressing member 63 are similar to those of the pressing member 53 described above and thus their description will not be given. The rear brake 41 is actuated when the rear brake wire 75 is pulled or when the left brake lever 60 is operated. That is, at least a portion of an operating force generated as the brake pedal 70 is operated, as discussed below, is transferred to the rear brake 41 via the rear brake wire 75, and an operating force generated as the left brake lever 60 is operated is transferred to this brake. In FIG. 3, character 63a designates a supported portion of the pressing member 63, character 63b designates a pressing portion of the pressing member 63, and character 63c designates a wire connecting portion of the pressing member 63.

Next, the structure of the brake pedal 70 will be described with reference to FIGS. 3, 5, 6A and 6B.

Figure 5:
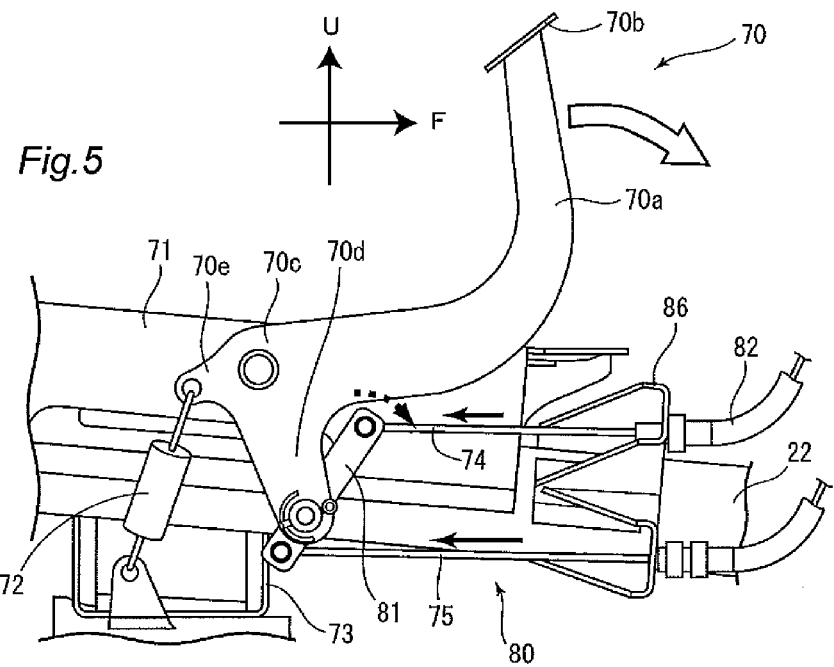
FIG. 5 illustrates the brake pedal and other components as viewed from the side of the vehicle.
Figure 6A:
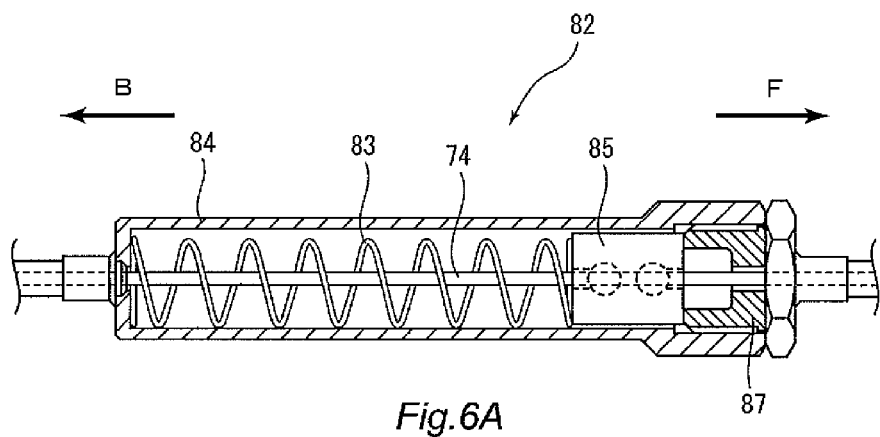
FIG. 6A is a schematic view of the load application unit.
Figure 6B:
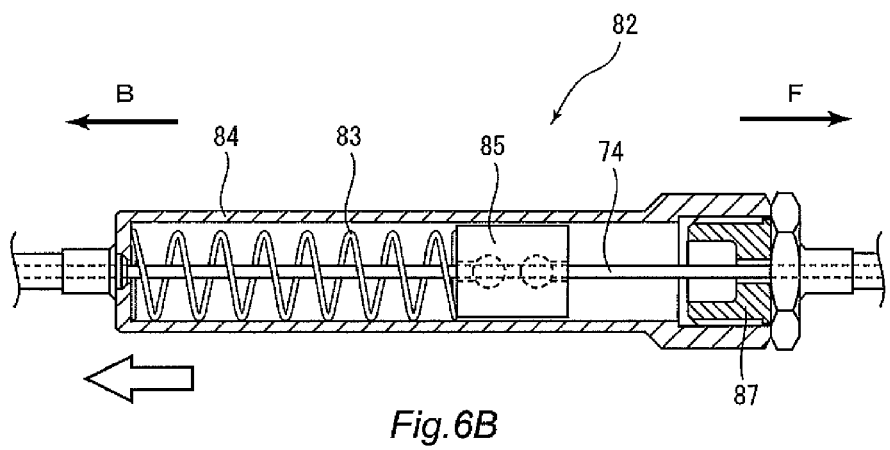
FIG. 6B illustrates how the load application unit can be operated when the front brake wire is pulled.

As shown in FIG. 5, the brake pedal 70 includes an arm 70a that is bent in an L shape as a whole, and a pedal 70b provided on one end of the arm 70a. The pedal 70b is located above the foot board 91. On the other end of the arm 70a and inside the foot board 91 is provided a supported portion 70c that is rotatably supported on a supporting member 71 on a down frame 22. The brake pedal 70 has a bent portion located toward the front with respect to the vehicle and is rotatable about a point on a supported portion 70c supported by the supporting member 71.

A projection 70d that protrudes downward with respect to the vehicle is provided on the other end of the arm 70a, which has the supported portion 70c. A wire coupling member 81 in the equalizer 80, discussed below, is rotatably attached to the projection 70d. On the other end of the arm 70a is provided a connecting portion 70e, which protrudes rearward with respect to the vehicle and to which one end of a spring 72 is attached. The spring 72 is connected with one end of a bracket 73, which has the other end attached to the down frame 22. Thus, when the brake pedal 70 is operated to rotate forward with respect to the vehicle, the spring 72 biases the brake pedal 70 back to its original position.

The equalizer 80 (operating force dividing unit) includes the wire coupling member 81, to which the front and rear brake wires 74 and 75 are connected, and a load application unit 82 (timing adjusting unit) provided on the front brake wire 74. The equalizer 80 uses the wire coupling member 81 to divide the operating force received by the brake pedal 70 into an operating force for the front brake wire 74 and an operating force for the rear brake wire 75. The front brake wire 74 causes the master cylinder 52 and pressing member 53 to transfer an operating force in the form of a hydraulic pressure to the front brake 31. The rear brake wire 75 causes the master cylinder 62 and pressing member 63 to transfer an operating force in the form of a hydraulic pressure to the rear brake 41. That is, an operating force provided by the equalizer 80 is transferred to the rear brake 41 via the rear brake wire 75.

The wire coupling member 81 is a rectangular plate and is rotatably supported on the projection 70d of the brake pedal 70 at a point on the wire coupling member 81 that is closer to one end thereof as measured in a longitudinal direction than the center thereof as measured in a longitudinal direction is. The front and rear brake wires 74 and 75 are connected with the respective ends of the wire coupling member 81 as measured in a longitudinal direction.

In the present embodiment, the front brake wire 74 is located above the rear brake wire 75 with respect to the vehicle. Thus, as the wire coupling member 81 is located to extend in a top-to-bottom direction with respect to the vehicle, the front brake wire 74 is connected with the upper end of the wire coupling member 81 with respect to the vehicle, while the rear brake wire 75 is connected with the lower end of the wire coupling member 81 with respect to the vehicle. The wire coupling member 81 is rotatably supported on the projection 70d of the brake pedal 70 at a point on the wire coupling member 81 that is located downward, with respect to the vehicle, of the center thereof as measured in a longitudinal direction, e.g., located close to its connection with the rear brake wire 75.

Thus, when the brake pedal 70 is operated to be rotated toward the front of the vehicle, as indicated by the hollow arrow in FIG. 5, the rear brake wire 75, which is connected with a point on the wire coupling member 81 that is located close to the projection 70d of the brake pedal 70, is pulled as the brake pedal 70 is rotated, as indicated by the corresponding solid arrow in FIG. 5. The wire coupling member 81 is rotated about a point on the projection 70d of the brake pedal 70, as indicated by the broken arrow in FIG. 5, by the reactive force of the front brake wire 74, which is connected to a point on the wire coupling member 81 that is far from the projection 70d.

The front and rear brake wires 74 and 75 are rotatably attached to the wire coupling member 81. More specifically, an end of each of the front and rear brake wires 74 and 75 has an annular connection, which is rotatably fitted into a circular hole formed in each end of the wire coupling member 81 as measured in a longitudinal direction. Thus, as the wire coupling member 81 is rotated about a point on the arm 70a of the brake pedal 70, the operating force of the brake pedal 70 is transferred to the front and rear brake wires 74 and 75 while the front and rear brake wires 74 and 75 remain in the same position as measured in a top-to-bottom direction and a left-to-right direction with respect to the vehicle.

The load application unit 82 is provided on the front brake wire 74. The load application unit 82 is configured to apply an initial set load to the front brake wire 74. More specifically, as shown in FIGS. 6A and 6B, the load application unit 82 includes a spirally-wound spring 83 (limiting member) located coaxially with the front brake wire 74 to surround the front brake wire 74, a guide 84 for containing the spring 83, and a piston 85 that is fixed to the front brake wire 74 and can be moved inside the guide 84. FIGS. 6A and 6B each show a cross section of the guide 84 to show the interior structure of the load application unit 82.

The guide 84 is a cylindrical member with a bottom, and is located on the front brake wire 74. The guide 84 is fixed to a bracket 86 provided on a down frame 22 at one end measured in a longitudinal direction (see FIG. 5). As shown in FIGS. 6A and 6B, inside the guide 84, the front brake wire 74 extends in a direction of the axis of the cylinder and the spring 83 is located toward the rear of the vehicle. Further, in the guide 84, the piston 85 fixed to the front brake wire 74 is located forward of the spring 83 with respect to the vehicle. The guide 84 has an opening. This opening is sealed with a plug member 87, wherein a portion of each of the front brake wire 74, the spring 83 and the piston 85 are located within.

In the load application unit 82 having the above structure, the piston 85 and spring 83 produce a biasing force toward the front of the vehicle for the front brake wire 74. More specifically, the piston 85 attached to the front brake wire 74 is pressed forward with respect to the vehicle by the spring 83. This biasing force by the spring 83 toward the front of the vehicle constitutes the initial set load (constant value) on the front brake wire 74. When the front brake wire 74 is pulled toward the rear of the vehicle, as indicated by the hollow arrow in FIG. 6B, the piston 85 attached to the front brake wire 74 moves toward the rear of the vehicle to compress the spring 83, as shown in FIG. 6B.

As shown in FIGS. 3 and 4, the front brake wire 74 is connected with the connecting portion 53c of the pressing member 53 provided adjacent to the right brake lever 50. The rear brake wire 75 is connected with the connecting portion 63c of the pressing member 63 provided adjacent to the left brake lever 60.

Thus, when the brake pedal 70 is operated to be rotated toward the front of the vehicle, as indicated by the hollow arrow in FIG. 5, the operating force is transferred to the front and rear brake wires 74 and 75 via the wire coupling member 81 (the solid arrows in FIG. 5 indicate the direction of pulling). At this point, if the operating force applied to the front brake wire 74 is smaller than the initial set load of the load application unit 82, the wire coupling member 81 is rotated toward the front of the vehicle, as indicated by the broken arrow in FIG. 5, such that only the rear brake wire 75 is pulled. When the rear brake wire 75 is pulled by the brake pedal 70, the pressing member 63 is rotated about a point on the supported portion 63a such that the pressing portion 63b of the pressing member 63 presses the piston of the master cylinder 62. This actuates the rear brake 41.

If the operating force acting on the front brake wire 74 when the brake pedal 70 is operated to be rotated toward the front of the vehicle, as indicated by the hollow arrow in FIG. 5, is equal to or larger than the initial set load of the load application unit 82, the front brake wire 74 moves toward the rear of the vehicle. When the front brake wire 74 is moved toward the rear of the vehicle by the brake pedal 70, the pressing member 53 is rotated about a point on the supported portion 53a such that the pressing portion 53b of the pressing member 53 presses the piston 52b of the master cylinder 52. This actuates the front brake 31.

Thus, in the above structure, operating the brake pedal 70 allows the front and rear brakes 31 and 41 to work in an interlocked manner and also allows the rear brake 41 to begin to be actuated earlier than the front brake 31. That is, in the above arrangement, the rear brake 41 receives an operating force transferred from the equalizer 80 at an earlier time than an operating force is transferred from the equalizer 80 to the front brake 31, as well as an operating force generated by the left brake lever 60. Further, the above arrangement allows the left brake lever 60 and brake pedal 70 to be operated simultaneously.

In the present embodiment, the brake system 6 includes a front brake 31, a rear brake 41, a right brake lever 50 for operating the front brake 31, a left brake lever 60 for operating the rear brake 41, and a brake pedal 70 for operating the front and rear brakes 31 and 41 such that the front and rear brakes 31 and 41 work in an interlocked manner. This will allow the front and rear brakes 31 and 41 to be actuated in an interlocked manner and also allow these brakes to be actuated independently.

In the present embodiment, the brake system 6 further includes an equalizer 80 for dividing an operating force received by the brake pedal 70 into an operating force for the front brake 31 and an operating force for the rear brake 41. Thus, the front and rear brakes 31 and 41 may be actuated by operating the brake pedal 70.

In the present embodiment, the equalizer 80 includes a load application unit 82 for causing an operating force to be transferred to the front brake 31 later than a time at which an operating force is transferred to the rear brake 41. Thus, when the brake pedal 70 is operated, the front and rear brakes 31 and 41 may be actuated at different times. That is, in the above arrangement, by operating the brake pedal 70, it is possible to actuate the rear brake 41 first and then actuate the front brake 31.

In the present embodiment, the brake system 6 further includes a front brake wire 74 for transferring an operating force from the equalizer 80 to the front brake 31, and a rear brake wire 75 for transferring an operating force from the equalizer 80 to the rear brake 41. The load application unit 82 includes a spring 83 for limiting the displacement of the front brake wire 74 until the operating force acting on the front brake wire 74 is equal to or larger than an initial set load. This configuration allows the front brake 31 to be actuated later than the rear brake 41.

In the present embodiment, each of the front and rear brakes 31 and 41 is a hydraulic brake including a cylinder and a piston movable within the cylinder, and the equalizer 80 transfers an operating force to the piston of each of the front and rear brakes 31 and 41.

In the present embodiment, the front brake operating device is the right brake lever 50 and the rear brake operating device is the left brake lever 60, and the front and rear brakes 31 and 41 may be work in an interlocked manner as the brake pedal 70 is actuated. This arrangement is the same as that of the levers of conventional motorcycles, mitigating the feel of difference experienced by the rider of the motorcycle when operating it.

In the present embodiment, the motorcycle 1 further includes a footboard 91 on which the feet of the rider may be placed. The brake pedal 70 is located such that a portion thereof protrudes above the footboard 91. The motorcycle 1 includes an equalizer 80 for dividing an operating force received by the brake pedal 70 into an operating force for the front brake 31 and an operating force for the rear brake 41. The equalizer 80 is located below the footboard 91. Thus, the equalizer 80 may be located near the brake pedal 70 such that the operating force of the brake pedal 70 may be efficiently divided by the equalizer 80 into an operating force to be supplied to the front brake 31 and an operating force to be supplied to the rear brake 41.

In the present embodiment, the brake system 6 includes a front brake wire 74 for transferring an operating force from the brake pedal 70 to the front brake 31, and a rear brake wire 75 for transferring an operating force from the brake pedal 70 to the rear brake 41. The front and rear brake wires 74 and 75 are supported by a body frame 11 and are located forward of the equalizer 80 with respect to the vehicle so as to be movable in a direction in which the wires extend. Thus, in an arrangement where master cylinders 52 and 62 are located near the right and left brake levers 50 and 60, respectively, the length of the brake wires up to the master cylinders 52 and 62 may be reduced. This will reduce the loss in the operating force applied to the brake wires to actuate the master cylinders.

In the present embodiment, the motorcycle 1 further includes an engine and a transmission for allowing the speed to be varied without the rider operating a clutch. The motorcycle 1 with this transmission will allow the left and right levers to be used for braking and thus is more preferable to realize the arrangement of the present embodiment.

Embodiment 2

Figure 7:
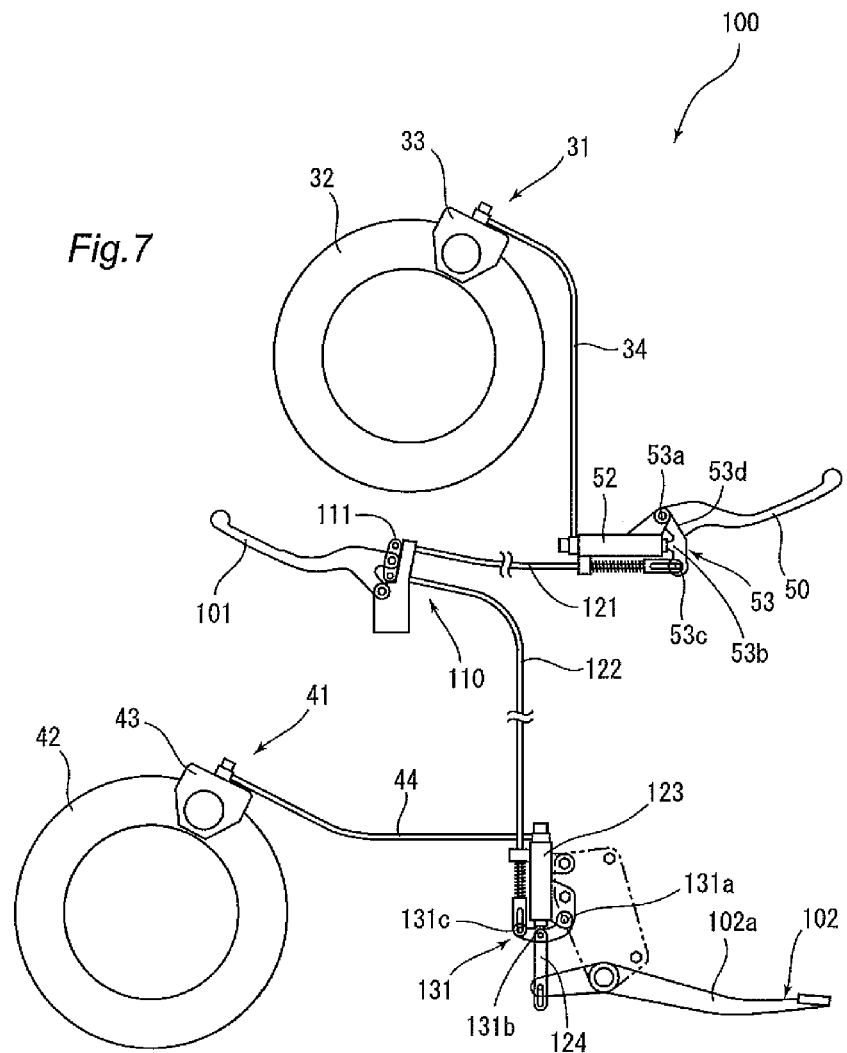
FIG. 7 is a schematic view of the overall construction of a motorcycle brake system according to Embodiment 2.

FIG. 7 schematically shows a brake system 100 according to Embodiment 2. This embodiment is different from Embodiment 1 in that a left brake lever 101 serves as an interlocking brake operating device and a brake pedal 102 serves as a rear brake operating device. In the following description, the same components as in Embodiment 1 are labeled with the same characters and their description will not be given, and only the features different from those of Embodiment 1 will be described.

As shown in FIG. 7, the left brake lever 101 is rotatably attached to the handlebars 12 about a point on one of its ends and is connected with a wire coupling member 111 of an equalizer 110, which has the same structure as the equalizer of Embodiment 1. That is, the left brake lever 101 is connected with the wire coupling member 111 such that the operating force of the left brake lever 101 is transferred to the wire coupling member 111 when the left brake lever 101 is rotated relative to the handlebars 12. More specifically, similar to the wire coupling member of Embodiment 1, the wire coupling member 111 is a rectangular plate, where the left brake lever 101 is connected with a point thereon that is located closer to one end thereof, as measured in a longitudinal direction, than the center thereof as measured in a longitudinal direction is. A front brake wire 121 is connected with the other end of the wire coupling member 111 as measured in a longitudinal direction, while a rear brake wire 122 is connected with the one end of the wire coupling member 111 in a longitudinal direction. The connection of the left brake lever 101 with the wire coupling member 111 is closer to the rear brake wire 122 than to the front brake wire 121.

The front brake wire 121 is connected with the pressing member 53 located adjacent to the right brake lever 50. The rear brake wire 122 is connected with the pressing member 131 located near the brake pedal 102.

Although not shown, similar to the equalizer 80 of Embodiment 1, the equalizer 110 includes a load application unit located on the front brake wire 121. The operation of the equalizer 110 is the same as that of the equalizer 80 of Embodiment 1 and thus its description will not be given.

Similar to the pressing members 53 and 63 of Embodiment 1, the pressing member 131 has a supported portion 131a, pressing portion 131b and connecting portion 131c. The supported portion 131a is a portion of the pressing member 131 that is to be connected with the body frame 11 (not shown). The supported portion 131a is rotatably supported on the body frame 11. The pressing member 131 extends from the supported portion 131a in one direction over the master cylinder 123. The connecting portion 131c is located close to the end of the pressing member 131 in a longitudinal direction that is opposite the end with the supported portion 131a. The rear brake wire 122 is connected with the connecting portion 131c. The pressing portion 131b is provided in the pressing member 131 between the supported portion 131a and connecting portion 131c. When the rear brake wire 122 connected with the connecting portion 131c is pulled, the pressing member 131 is rotated about a point on the supported portion 131a such that the pressing portion 131b presses the piston of the master cylinder 123.

A connecting arm 124 has one end connected with the brake pedal 102 and the other end connected with the pressing portion 131b of the pressing member 131. The brake pedal 102 includes an arm 102a with a bend protruding upward with respect to the vehicle and is rotatably supported on the body frame 11 at the bend of the arm 102a. Thus, when the rider kicks on one end of the brake pedal 102, the other end of the arm 102a is raised upward with respect to the vehicle such that the connecting arm 124 connected with the other end of the arm 102a and pressing member 131 are raised upward.

Thus, as the brake pedal 102 is operated, the piston of the master cylinder 123 is pressed by the pressing portion 131b of the pressing member 131.

In the above arrangement, the rear brake 41 may be actuated by operating the left brake lever 101, and the rear brake 41 may also be actuated by operating the brake pedal 102. In other words, the brake pedal 102 may serve as the rear brake operating device and the left brake lever 101 may serve as the interlocking brake operating device.

In the present embodiment, the front brake operating device is the right brake lever 50, the rear brake operating device is the brake pedal 102, and the interlocking brake operating device is the left brake lever 101. Similar to Embodiment 1, this arrangement allows the front and rear brakes 31 and 41 to be actuated in an interlocked manner and also allows the brakes to be actuated independently.

Other Embodiments

Although embodiments of the present invention have been described, the above embodiments are merely examples that may be used to carry out the present invention. As such, the present invention is not limited to the above embodiments, and the above embodiments may be modified as appropriate without departing from the spirit of the invention.

In the above embodiments, the equalizer 80 or 110 is located near a brake operating device. Alternatively, an equalizer may be located far from a brake operating device.

In the above embodiments, the equalizer 80 or 110 includes the wire coupling member 81 or 111 and the load application unit 82. However, an equalizer may have any structure that allows the operating force received by the associated brake operating device to be divided among the front and rear brake wires.

In the above embodiments, the right brake lever 50 implements the brake operating device for the front brake 31, and the left brake lever 60 or brake pedal 102 implements the brake operating device for the rear brake 41. Alternatively, the right brake lever may be used as a brake operating device for a brake other than the front brake 31 and the left brake lever and brake pedal may be used as brake operating devices for a brake other than the rear brake 41. Further, left and right brake pedals may be provided.

In the above embodiments, when the interlocking brake operating device is operated, the front brake 31 is actuated later than the rear brake 32. Alternatively, the front brake 31 may be actuated first, or the front and rear brakes 31 and 32 may be actuated simultaneously.

In the above embodiments, the front and rear brakes 31 and 41 are hydraulic disc brakes. Alternatively, the front and rear brakes 31 and 41 may be brakes of other types.

What is claimed is:

1. A straddle type vehicle comprising:
a chassis;
a front wheel;
a handlebar configured to control a direction of the front wheel; and
a straddle type vehicle brake system including
a front brake;
a rear brake;
a front brake operating device configured to operate the front brake;
a rear brake operating device configured to operate the rear brake;
an interlocking brake operating device configured to operate the front brake and the rear brake; and
an operating force dividing unit configured to divide an operating force received by the interlocking brake operating device into an operating force for the front brake and an operating force for the rear brake;
wherein the front brake and the rear brake work in an interlocked manner; and
wherein the operating force dividing unit includes a timing adjusting unit configured to cause an operating force to be transferred to the front brake after a time at which an operating force is transferred to the rear brake.

2. The straddle type vehicle according to claim 1, wherein:
the front brake operating device is a right brake lever;
the rear brake operating device is a left brake lever;
the interlocking brake operating device is a brake pedal; and
the left brake lever and the right brake lever are provided on the handlebar.

3. The straddle type vehicle according to claim 2, further comprising a footboard attached to the chassis and on which a foot of a rider is to be placed;
wherein the brake pedal is located such that a portion thereof protrudes above the footboard; and
wherein the operating force dividing unit is located below the footboard.

4. The straddle type vehicle according to claim 3, wherein:
the straddle type vehicle brake system includes a front brake wire configured to transfer an operating force from the interlocking brake operating device to the front brake and a rear brake wire configured to transfer an operating force from the interlocking brake operating device to the rear brake; and
the front brake wire and the rear brake wire are supported by the chassis and are located forward of the operating force dividing unit with respect to the vehicle so as to be movable in a direction in which the wires extend.

5. The straddle type vehicle according to claim 1, wherein:
the front brake operating device is a right brake lever;
the rear brake operating device is a brake pedal; and
the interlocking brake operating device is a left brake lever.

6. The straddle type vehicle according to claim 1, further comprising:
an engine; and
a transmission configured to allow a speed to be varied without a rider operating a clutch.

7. The straddle type vehicle according to claim 1, wherein:
the front brake operating device is a left brake lever;
the rear brake operating device is a right brake lever; and
the interlocking brake operating device is a brake pedal.

8. A straddle type vehicle brake system comprising:
a front brake;
a rear brake;
a front brake operating device configured to operate the front brake;
a rear brake operating device configured to operate the rear brake;
an interlocking brake operating device configured to operate the front brake and the rear brake; and
an operating force dividing unit configured to divide an operating force received by the interlocking brake operating device into an operating force for the front brake and an operating force for the rear brake;
wherein the front brake and the rear brake work in an interlocked manner; and
wherein the operating force dividing unit includes a timing adjusting unit configured to cause an operating force to be transferred to the front brake after a time at which an operating force is transferred to the rear brake.

9. The straddle type vehicle brake system according to claim 1, further comprising:
   a front brake wire configured to transfer an operating force from the operating force dividing unit to the front brake; and
   a rear brake wire configured to transfer an operating force from the operating force dividing unit to the rear brake;
   wherein the timing adjusting unit includes a limiting member configured to limit displacement of the front brake wire until an operating force acting on the front brake wire is larger than a predetermined value.

10. The straddle type vehicle brake system according to claim 1, wherein:
    each of the front brake and the rear brake is a hydraulic brake including a cylinder and a piston movable within the cylinder; and
    the operating force dividing unit transfers an operating force to the piston of each of the front brake and the rear brake.

\* \* \* \* \*